Jan. 23, 1923.
R. LEFEBVRE ET AL.
DENTAL DISK HOLDER.
FILED AUG. 18, 1919.
1,443,079
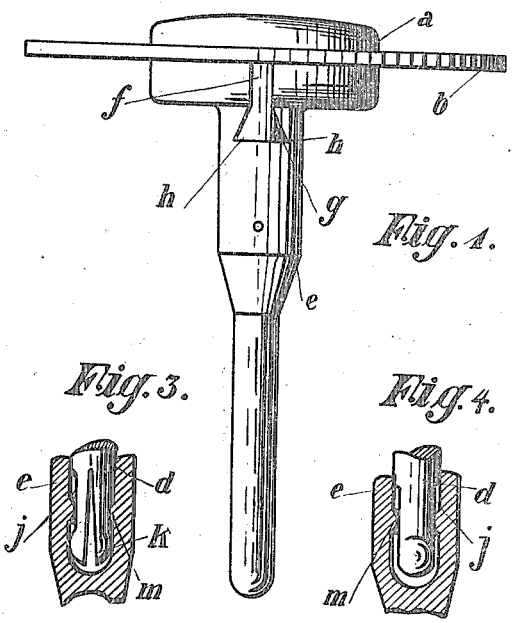
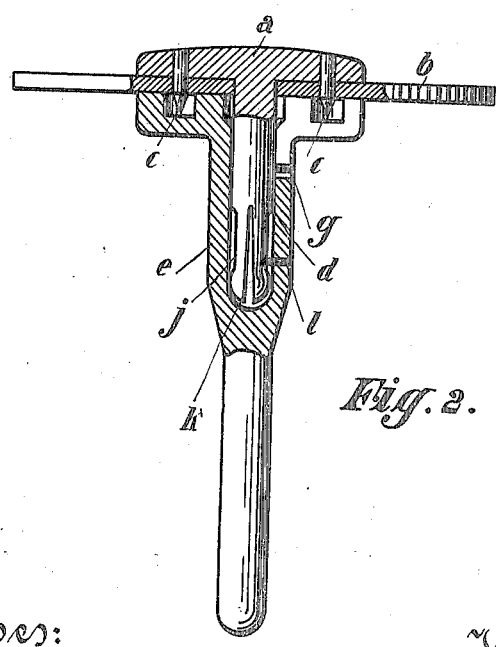

Patented Jan. 23, 1923.

1,443,079

UNITED STATES PATENT OFFICE.

RENÉ LEFEBVRE, OF BERNE, AND ALBERT RAMSEIER, OF NEUCHATEL, SWITZERLAND.

DENTAL DISK HOLDER.

Application filed August 18, 1919. Serial No. 318,337.

*To all whom it may concern:*

Be it known that we, RENÉ LEFEBVRE and ALBERT RAMSEIER, residing at Berne and at Neuchatel, Switzerland, have invented certain new and useful Improvements in Dental Disk Holders (for which I have filed application in Switzerland, June 6, 1918, Patent No. 80,571), of which the following is a specification.

The present invention relates to a dental disk-holder for securing cutters, emery wheels and the like, of various thicknesses at the end of a spindle and relates especially to that kind of holders, where the disk is clamped between two flat heads, the one provided at the end of a hollow mandrel and the other at the end of a shank which is adapted to be inserted into said mandrel.

The annexed drawing represents as an example one working form of the disk-holder.

Fig. 1 is a side elevation,

Fig. 2 an axial section partly in view and

Figs. 3 and 4 are sections embodying well known devices for retaining a shank within a mandrel.

In the drawing $e$ and $d$ are well known forms of the mandrel-member and of the shank-member of a disk-holder, both members having flat heads between which the disk $b$, such as a cutter or an emery wheel is held in working position. As is usual in such holders, the disk is carried along with the shank by means of two pins $c$ fast to the head $a$ of shank $d$, said pins projecting through two holes provided in the disk $b$ into an annular groove provided within the head of the mandrel.

The novel feature of this invention resides in the fact, that there is a slot $f$ cut into the face of the head of the mandrel and extended into a trapezoidal hole $h$ cut into the side wall of said mandrel and that a pin $g$ is fast to the shank, which pin, when the shank is inserted into the mandrel is adapted to pass through said slot $f$ and to project into the hole $h$ where, after a slight turn of the shank, it bears against one or the other of the bevel edges of the hole, according to the direction in which the tool is turned, said edges acting as driving edges of the shank. To this end the inclination of said edges is such, that they are running at an acute angle with regard to a radial plane of symmetry put through the hole and the axis of the mandrel. The steepness of these inclined edges is purposely chosen in order to prevent too much wedging of the grip which would hinder a quick unlocking of the same and the quick removal of the disk. The small wedging effect of the said inclined edges is quite sufficient for maintaining the disk fast between the two flat heads on account of the great torsional effort exerted on the shank. Still in certain cases it might be useful to provide said shank with such well known means as shown in Figs. 2, 3 and 4 where its inner end is recessed at $j$ and split open into two resilient legs which may be clamped by a set screw $l$ or by an annular projection $m$ inside the bore of the mandrel.

The advantage of this arrangement of the grip in dental disk holders of this kind is that such holders are not depending so much of the thickness of the tool, that tools of different thicknesses, within a certain limit, may be mounted therein, as the height of the trapezoidally shaped hole will permit of it.

But the most important feature of this arrangement consists in the fact that the disks which are mostly made of emery paper and the like and which will therefore be rapidly worn, may be quickly exchanged as no clamping grip of the pin $g$ within the hole $h$ has to be overcome as in some disk holders known heretofore.

In these latter disk holders the user had to fix the disks when mounting the same by an extra turn given to the disk by hand in order to clamp the same fast into its working position, while with the present arrangement no extra turn by hand is needed as the disk after the head having been introduced, will take its place automatically simply under the effect of the bevel edges of the hole $h$ and owing to the turning movement of the disk.

We are well aware that there are dental disk holders with mandrels, where the shank member has lugs adapted to engage into a spring operated head of the mandrel member and other holders, where one of the two members between which the disk is adapted to be clamped is provided with oblique walls, while the other member has lugs engaging said walls with a strong wedging effect locking the disk.

What we claim is:

In a dental disk holder for cutters emery wheels and the like the combination comprising a hollow mandrel with flat head, a shank inserted thereinto and provided with flat head, two driving pins fast to the head of the shank, an annular groove in the mandrel's head for receiving said pins, a radial slot provided on the face side of the mandrel's head, a trapezoidal extension of this slot in the mandrel's side wall and a pin fast to the shank and projecting into said extension, all substantially as shown and described and for the purpose set forth.

In testimony whereof we affix our signatures.

RENÉ LEFEBVRE.
ALBERT RAMSEIER.